April 17, 1934.  A. CROSSLEY  1,955,359
DIEZO ELECTRIC CRYSTAL APPARATUS
Original Filed March 9, 1926  2 Sheets-Sheet 1
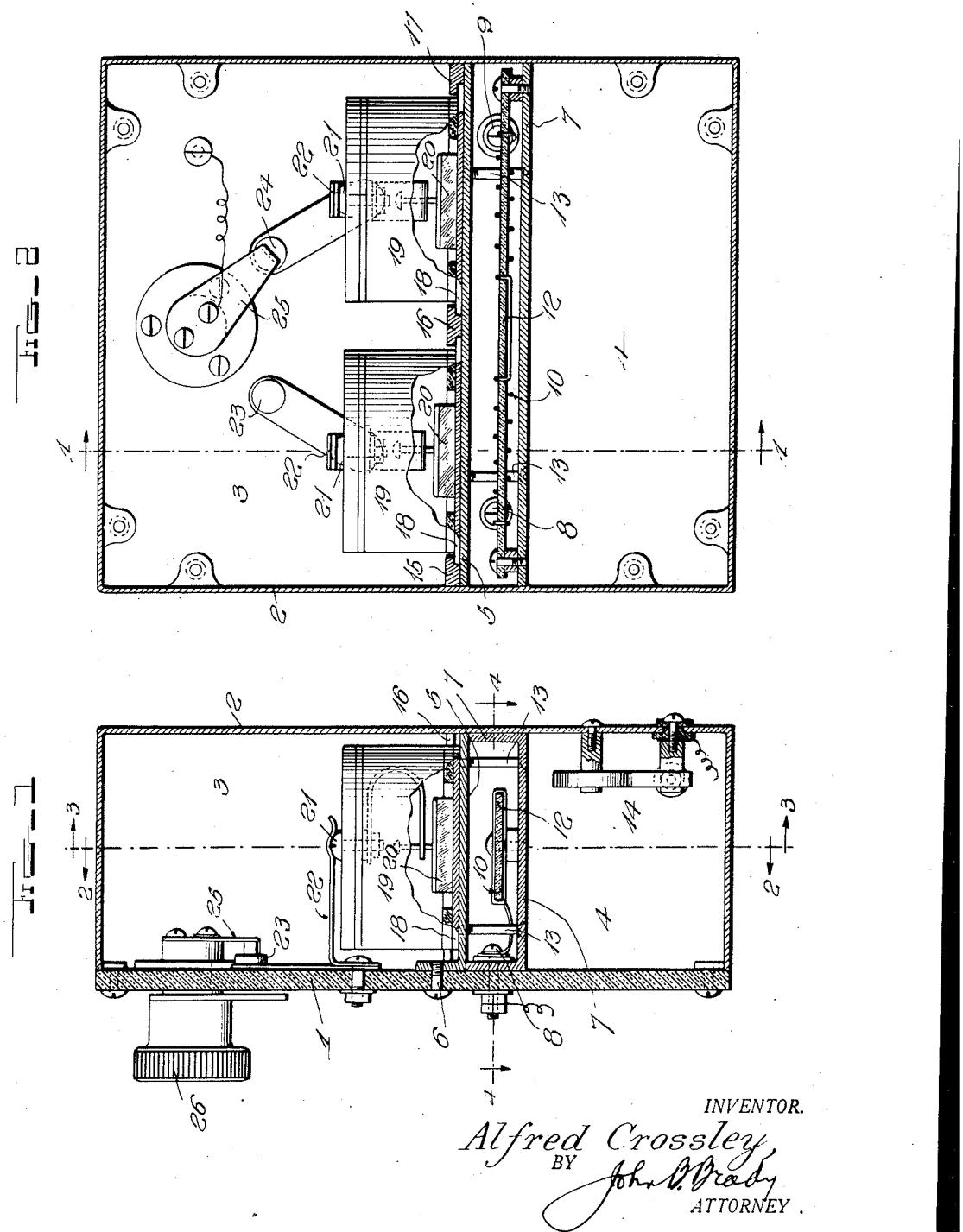
INVENTOR.
Alfred Crossley
BY
John D. Brady
ATTORNEY.

April 17, 1934.   A. CROSSLEY   1,955,359
DIEZO ELECTRIC CRYSTAL APPARATUS
Original Filed March 9, 1926   2 Sheets-Sheet 2
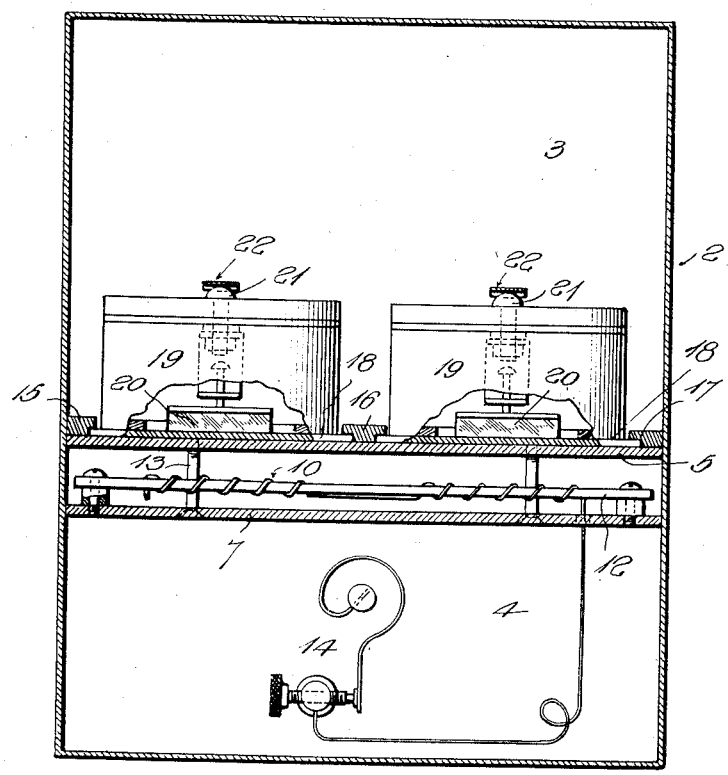
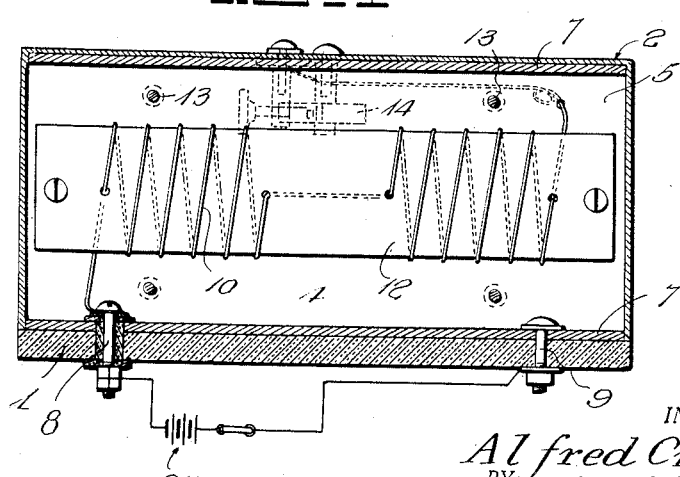
INVENTOR.
Alfred Crossley,
BY John B. Brady.
ATTORNEY.

Patented Apr. 17, 1934

1,955,359

UNITED STATES PATENT OFFICE 1,955,359

PIEZO ELECTRIC CRYSTAL APPARATUS

Alfred Crossley, South Haven, Mich., assignor, by mesne assignments, to Wired Radio, Inc., New York, N. Y., a corporation of Delaware Application March 9, 1926, Serial No. 93,485
Renewed August 27, 1932

5 Claims. (Cl. 219—19)

My invention relates broadly to piezo electric crystal apparatus, and more particularly to a container for piezo electric crystals whereby the operating temperatures of the piezo electric crystal may be maintained at a predetermined value.

One of the objects of my invention is to provide a mounting for piezo electric crystals with means for controlling the temperature of the piezo electric crystal for securing maximum piezo electric effect from the crystal.

Another object of my invention is to provide a container for a plurality of piezo electric crystal devices, which container is divided into separate compartments, in one of which there is arranged a thermo-statically controlled heating unit for maintaining the temperature of the other compartment in which the piezo electric crystals are located at a uniform temperature.

Another object of my invention is to provide a construction of piezo electric crystal housing and temperature-control unit for maintaining the piezo electric crystal at a proper temperature for securing maximum output from the crystal.

Still another object of my invention is to provide means for conductively transferring heat from a thermo-statically controlled system to a piezo electric crystal for maintaining the crystal at a predetermined operating temperature for securing maximum piezo electric effect from the crystal.

My invention contemplates the employment of piezo electric crystals for frequency control of high power oscillators, and I have found that in order that a predetermined frequency may be maintained the piezo electric crystals must be maintained at a certain definite temperature. The manner in which I construct the piezo electric crystal apparatus will be more fully understood from the following specification by reference to the accompanying drawings, wherein:

Figure 1 is a cross-sectional view through the piezo electric crystal apparatus of my invention showing one of the piezo electric crystal holders partially broken away with the piezo electric crystal shown therein; Fig. 2 is a view looking at the rear of the piezo electric crystal apparatus on line 2—2 of Fig. 1 showing a plurality of piezo electric crystal holders with the housings thereof broken away to show the piezo electric crystals mounted therein; Fig. 3 is a sectional view on line 3—3 of Fig. 1 through the piezo electric crystal apparatus showing more clearly the thermo-statically controlled heating unit located in one compartment of the apparatus; and Fig. 4 illustrates in plan view a heating coil mounted in the compartment immediately beneath the piezo electric crystal holders.

In the piezo electric control of high power signal transmission systems I have determined that in order to maintain the transmitting frequency constant that the piezo electric crystal in the oscillator circuit must be maintained at a definite temperature. There is a definite temperature required in order to obtain a fixed and predetermined frequency for which the crystal is ground. The changes in temperature which are encountered in aircraft radio transmitters at varying altitudes, for example, tend to shift the operating frequency of the piezo electric crystal. In mobile radio transmission stations, such as transmitters installed on shipboard, the temperature in different geographical locations varies widely and tends to impair the output efficiency of the piezo electric crystal in the control circuit.

By my present invention I provide a system for conductively heating piezo electric crystals for maintaining maximum output from the piezo electric crystal at a predetermined frequency. A cabinet is provided having separate chambers therein, one chamber enclosing a thermostatically controlled heating unit arranged to maintain a divided partition member at a predetermined temperature. In the opposite chamber and secured to the partition member I provide any desired number of piezo electric crystal holders. Each holder may be detachably supported upon the partition member with the end plate which closes each piezo electric crystal holder in immediate contact with the heated partition plate. By reason of the mechanical contact between the piezo electric crystal holder and the heated partition plate, heat is transferred by conduction to the piezo electric crystal for maintaining the crystal at a constant temperature.

My invention will be understood in more detail by reference to the drawings, in which: Reference character 1 designates an insulated panel which forms the front closure member for a cabinet formed by the abutment of the rear casing 2 with the panel 1. The cabinet structure 2 is divided into compartments 3 and 4 separated by means of a metallic plate partition member 5 which is secured to the front panel 1 by suitable means, such as screws 6. Immediately beneath the metallic partition 5 I provide a heater unit housed in a casing 7 secured by means of binding posts 8 and 9 to the front panel 1. Within the casing 7 a heater coil 10 is wound upon an insulated core 12 supported in spaced relationship from the casing 7 and from the metallic partition plate 5. The casing 7 is rigidly secured with respect to the partition plate 5 by means of screws 13 which also serve to conductively transfer heat from the casing 7 to the partition plate 5. Heat is normally transferred by radiation from the winding 10 to the metallic partition plate 5 or to the casing 7 and thence conductively through screw members 13 to the metallic partition plate 5. In chamber 4 I provide the thermostatically controlled element 14 which connects in series with the heater coil 10 and through binding posts 8 and 9 with the external source designated at 27 in Fig. 4. The post which carries the thermostatically controlled element 14 is grounded to the casing 2, and similarly binding post 9 is grounded to casing 2, thus completing the circuit through heater coil 10, binding post 8 which is insulated from casing 2, battery 27, binding post 9, the central post of the thermostatic device 14, through the movable element of thermostatic device 14 which is insulated from casing 2, back to one end of the heater coil 10. In the compartment 3 and secured upon partition plate 5 I provide guide members 15, 16 and 17 between which piezo electric crystal holders 19, such as described in my Letters Patent 1,572,773 dated February 9, 1926, may be detachably supported with the end closure plates 18 thereof in direct mechanical contact with the metallic partition plate 5. In order to more clearly illustrate the principles involved I have shown the crystal holders 19 in side elevation partially broken away and in section to illustrate the piezo electric crystal 20 within the holder resting upon the metallic plate 18 which is in direct contact with partition plate 5. The upper surface of the piezo electric crystal is electrically connected to terminal 21 which may establish electrical contact with spring clip 22 secured on panel 1. The spring clip 22 for each of the piezo electric crystal holders connects to contacts 23 and 24 over which switch arm 25 controlled by knob 26 from the front of panel 1 may be moved for selecting a particular piezo electric crystal from a plurality of piezo electric crystals within the cabinet structure.

For the purpose of illustrating my invention I have shown merely two separate piezo electric crystal holders, but I desire that it be understood that any number of piezo electric crystals ground to different frequency characteristics may be housed within the cabinet structure and selectively connected in an electrical control circuit. The fact that the bottom plate 18 of each piezo electric crystal holder is in direct contact with the heated plate 5 results in the conductive transfer of a desired amount of heat to the piezo electric crystals. This heat is maintained at a constant temperature by means of the thermostatic control sytsem 14. It is extremely important, especially at high frequencies, that the temperature of the crystal be kept constant because a change of one degree (centigrade) will change the crystal frequency 20 parts in a million. Any radical change in temperature of the crystal is undesirable because the crystal at one temperature will be resonant to two frequencies very close to each other, while at lower temperatures the crystal is resonant to only one frequency. If two crystals are used for synchronous operation it will be found that maximum output is obtained at one temperature. This is due to the fact that at this particular temperature both crystals are resonant to only one frequency, and by increasing or decreasing the temperature, the crystals will be resonant to frequencies slightly different from each other. This latter condition can be attributed to one crystal having a negative temperature coefficient while the other has a positive temperature coefficient.

The indirect thermostatic control has many advantages in keeping individual crystals heated to the correct temperature with the attendant benefits to be gained from a more even heat variation and at the same time providing means to keep the crystal free from dirt and moisture effects.

It will be understood that various types of crystal holders may be used within the cabinet structure and that such holders may be renewed from time to time by merely removing the rear housing 2 from the front panel 1. I desire that it be further undestood that various modifications may be made in the structure of the cabinet without departing from the spirit of my invention, and I intend no limitations upon my invention other than are imposed by the scope of the appended claims.

What I claim and desire to secure by Letters Patent of the United States is as follows:

1. Piezo electric crystal apparatus comprising a temperature control cabinet, a partition plate of heat conducting material separating said cabinet into compartments, heating means located in one of said compartments, a temperature regulating device in one of said compartments for controlling the operation of said heating means, piezo electric crystal holders each housing a piezo electric crystal element, heat transfer plates secured to each of said holders and engageable with said heat conductive partition plate, whereby heat is transferred from said heating means to said piezo electric crystal holders for maintaining the piezo electric element therein at a predetermined temperature under control of the temperature regulating device.

2. A constant temperature piezo electric apparatus comprising, in combination, a cabinet, a heat conducting member in said cabinet, means carried by said member for supporting a plurality of piezo electric devices in contact with one side thereof, heating means adjacent the opposite side of said member, thermally operated means mounted in said cabinet for controlling said heating means, and means for making electrical connection to a selected one of said piezo electric devices.

3. A piezo electric apparatus as defined in claim 2 wherein each of said piezo electric devices comprises a piezo electric crystal mounted in a closed container, one side of said container being composed of heat conducting material and adapted to engage said supporting means.

4. Piezo electric apparatus comprising at least one piezo electric crystal mounted for free vibration within a crystal holder, a casing, a heat conductive partition wall within said casing adapted to support at least one said crystal holder, means for removably retaining said crystal holder in intimate heat conducting relation to said partition wall, and a thermostatically controlled heating element within said casing and separated from said crystal holder by said partition wall.

5. Piezo electric apparatus comprising a casing having at least two compartments, a heat conducting partition separating said compartments, a piezo electric crystal, a closed crystal holder within which said crystal is operatively mounted, means on one side of said partition for producing thermostatically controlled heat to be communicated through said partition and means on the other side of said partition for removably retaining said crystal holder in intimate heat conducting relation to said partition whereby heat is readily conducted to said crystal and the temperature of said crystal is maintained constant.

ALFRED CROSSLEY.